(12) United States Patent
Higashihara et al.

(10) Patent No.: US 9,413,628 B2
(45) Date of Patent: Aug. 9, 2016

(54) NETWORK RELAY NODE DEVICE, NETWORK RELAY METHOD, AND RECORDING MEDIUM

(71) Applicant: FUJITSU LIMITED, Kawasaki-shi, Kanagawa (JP)

(72) Inventors: Yuji Higashihara, Fukuoka (JP); Kenji Maeda, Kasuga (JP)

(73) Assignee: FUJITSU LIMITED, Kawasaki (JP)

( * ) Notice: Subject to any disclaimer, the term of this patent is extended or adjusted under 35 U.S.C. 154(b) by 411 days.

(21) Appl. No.: 13/625,196

(22) Filed: Sep. 24, 2012

(65) Prior Publication Data
US 2013/0016627 A1 Jan. 17, 2013

Related U.S. Application Data

(63) Continuation of application No. PCT/JP2010/002397, filed on Mar. 31, 2010.

(51) Int. Cl.
| | | |
|---|---|---|
| H04L 12/28 | (2006.01) |
| G06F 15/173 | (2006.01) |
| G06F 15/177 | (2006.01) |
| H04L 12/26 | (2006.01) |
| H04L 12/18 | (2006.01) |
| H04L 12/46 | (2006.01) |
| H04L 12/705 | (2013.01) |

(52) U.S. Cl.
CPC ............ *H04L 43/10* (2013.01); *H04L 12/1886* (2013.01); *H04L 12/462* (2013.01); *H04L 12/4625* (2013.01); *H04L 45/18* (2013.01)

(58) Field of Classification Search
None
See application file for complete search history.

(56) References Cited

U.S. PATENT DOCUMENTS

2004/0167988 A1\* 8/2004 Rune et al. .................... 709/238
2006/0265480 A1\* 11/2006 Kim et al. ..................... 709/220
2008/0049764 A1\* 2/2008 Solomon et al. .............. 370/401
2008/0112422 A1\* 5/2008 Jetcheva et al. .............. 370/406

FOREIGN PATENT DOCUMENTS

| JP | 2005-130049 | 5/2005 |
| JP | 2006-279168 | 10/2006 |
| JP | 2007-243288 | 9/2007 |

OTHER PUBLICATIONS

Notification of Transmittal of the International Preliminary Report on Patentability mailed Nov. 1, 2012 in corresponding International Application No. PCT/JP2010/002397.
Sawatte Nattoku! Network Jikkenshitsu, 2002, 9 pages.
International Search Report mailed Jun. 22, 2010 issued in corresponding International Patent Application No. PCT/JP2010/002397.
Office Action issued May 28, 2013 in corresponding Japanese Application No. 2012-507916.

\* cited by examiner

*Primary Examiner* — Kiet Tang
(74) *Attorney, Agent, or Firm* — Staas & Halsey LLP

(57) ABSTRACT

A network relay node device for relaying communication between a first network and a second network having a protocol different from a protocol of the first network through a switch, the network relay node device includes an identical segment information generation control unit that generates identical segment information for identification of another relay node device belonging to a same segment as a local device in the second network and a loop suppression control unit that suppresses a loop of a communication including the switch by broadcasting a received broadcast frame only to a connection port of the first network if the identical segment information is detected in identification source node information acquired from a header of the broadcast frame when the broadcast frame is received from a connection port of the first network.

19 Claims, 16 Drawing Sheets

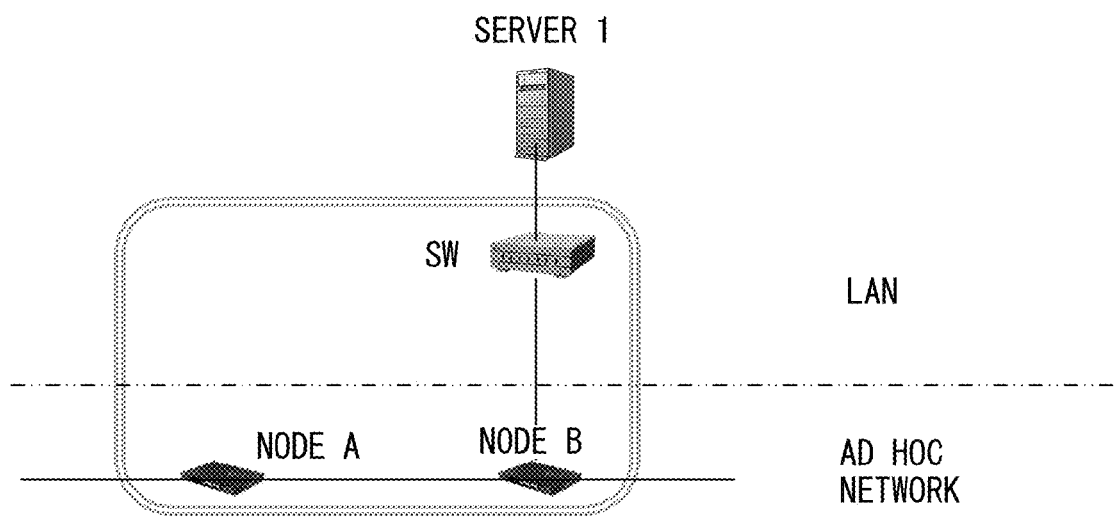
F I G. 1

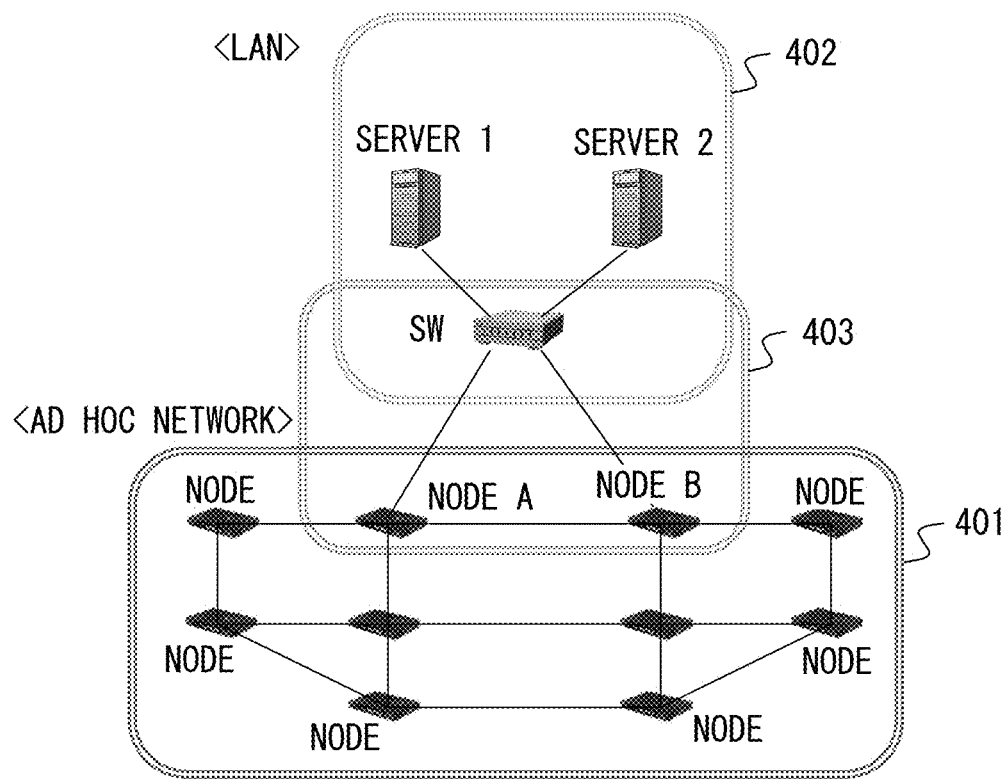
F I G. 4

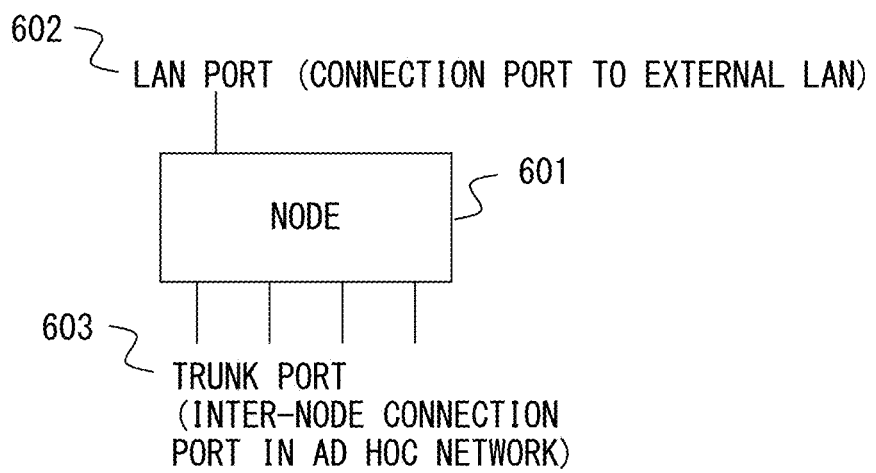
F I G. 6

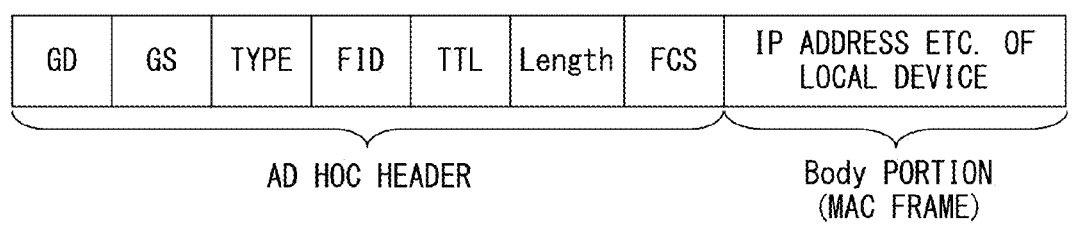
F I G. 8

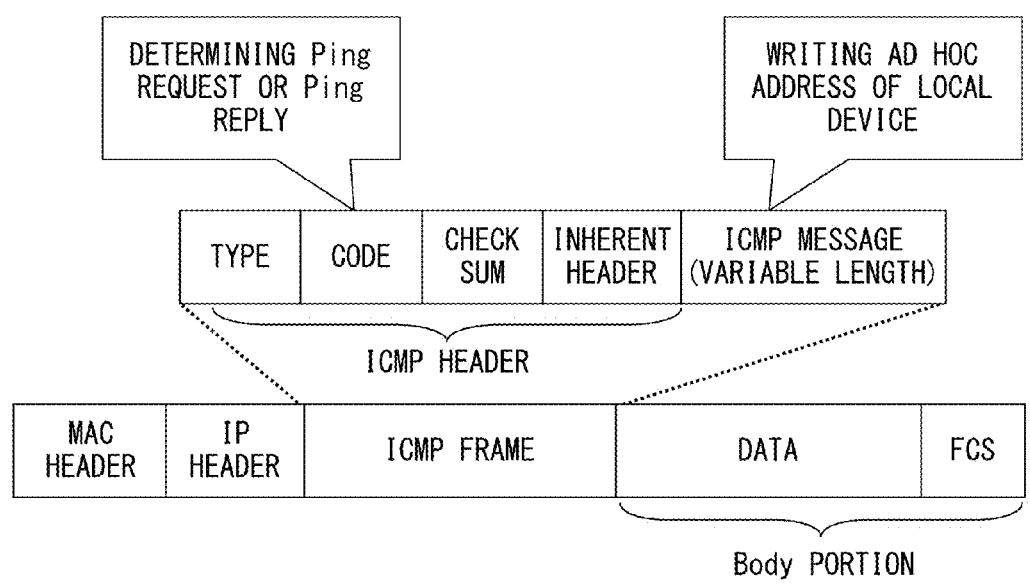
F I G. 9

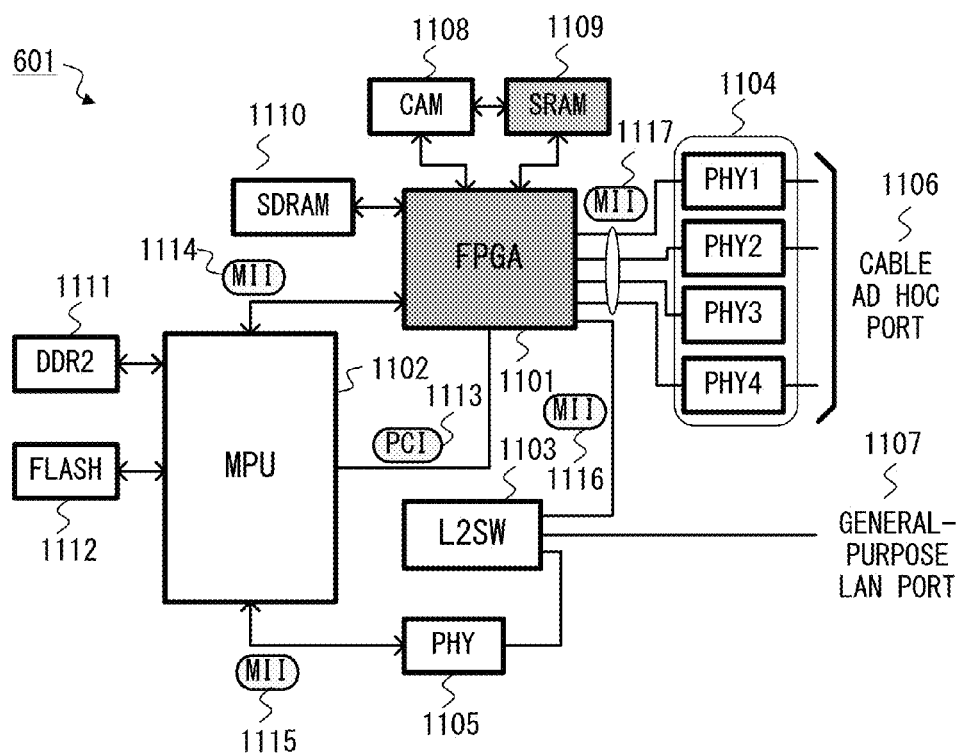
F I G. 1 1

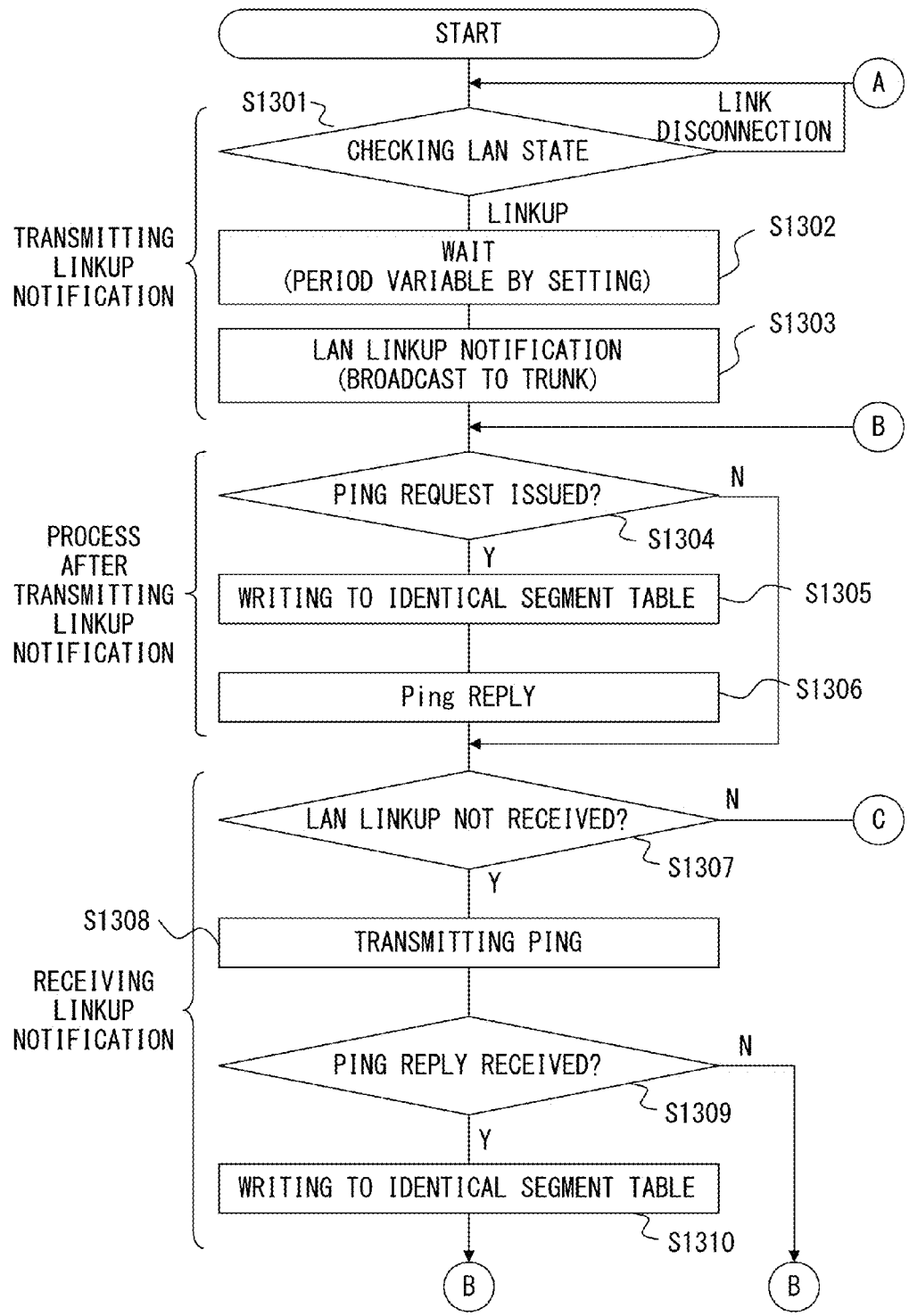
F I G. 13A

NETWORK RELAY NODE DEVICE, NETWORK RELAY METHOD, AND RECORDING MEDIUM

CROSS-REFERENCE TO RELATED APPLICATION

This application is a continuation application of International Application PCT/JP2010/002397 filed on Mar. 31, 2010 and designated the U.S., the entire contents of which are incorporated herein by reference.

FIELD

The embodiments discussed herein are related to a network relay node technique for relaying communication between a first network and a second network having a communication protocol different from the communication protocol of the first network.

BACKGROUND

The first network is a network, for example, an ad hoc network for connection of communication units directly or through another communication unit by cable or by wireless without using a network connection device such as a router, an access point, a base station, etc.

Furthermore, the second network having a protocol different from the protocol of the first network is a network, for example, a LAN (local area network) for collecting various types of information from a node as a terminal configuring, for example, an ad hoc network. In the second network, communication units are connected through, for example, a network connection device.

As a configuration in which the first and second networks are connected, for example, a switch in a LAN is connected to a network relay node as a communication unit in an ad hoc network, and is connected to a server computer as a communication unit in a LAN (hereafter simply referred to as a "server"). Then, the server in the LAN controls each node in the ad hoc network or collects information from each node.

As an example of the configuration above, a server for collecting the sensor information in the LAN collects various types of sensor information from a node in an ad hoc network operating as sensor equipment.

With the above-mentioned configuration in which the first and second networks are connected, assume that broadcast information is transmitted from the server in the second network to the first network.

For example, in FIG. 1, the broadcast information transmitted from a server 1 in the LAN is received by a switch SW. After recognizing the broadcast information, the SW transmits the broadcast information to the node B in the connected ad hoc network. After receiving the broadcast information, the node B transmits the broadcast information to all ports connected to the local node, for example, to the node A and other nodes.

In this case, in the first network such as an ad hoc network etc., each node configuring the network has a mesh-shaped connection configuration. Therefore, a route is physically looped. When the communication information is looped, normal routing is not performed. However, a system in which the communication information passing through the route is not looped although the route is physically looped is incorporated into the first network.

In the communication system capable of communicating independent of the protocol of a network layer between an ad hoc network and a communication device on a LAN segment connected to the ad hoc network, there is a technique of determining a communication device as a destination of a frame from the path table to the communication device in the ad hoc network (for example, the patent document 1).

Patent Document 1: Japanese Laid-open Patent Publication No. 2006-279168

SUMMARY

According to an aspect of the embodiments, a network relay node device for relay from a first network to a second network having a protocol different from a protocol of the first network through a switch includes: an identical segment information generation control unit for generating identical segment information for identification of another relay node device belonging to a same segment as a local device in the second network; and a loop suppression control unit for suppressing a loop of a communication including the switch by broadcasting a received broadcast frame only to a connection port of the first network if the identical segment information is detected in identification source node information acquired from a header of the broadcast frame when the broadcast frame is received from a connection port of the first network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a configuration of a certain network;

FIG. 4 is an example of a configuration of the network system according to the embodiment;

FIG. 6 is a configuration of the connection port of a node;

FIG. 8 is an example of a configuration of data of a "LAN side link-up notification" command;

FIG. 9 is an example of a configuration of data of a Ping request command and reply;

FIG. 11 is a configuration of the hardware of a node;

FIGS. 13A and 13B are flowcharts of the entering, updating, and deleting processes of the identical segment table;

DESCRIPTION OF EMBODIMENTS

In interconnecting the above-mentioned first and second networks, the connection between the server etc. in the second network and the node in the first network may need to be duplex.

Figure 2:
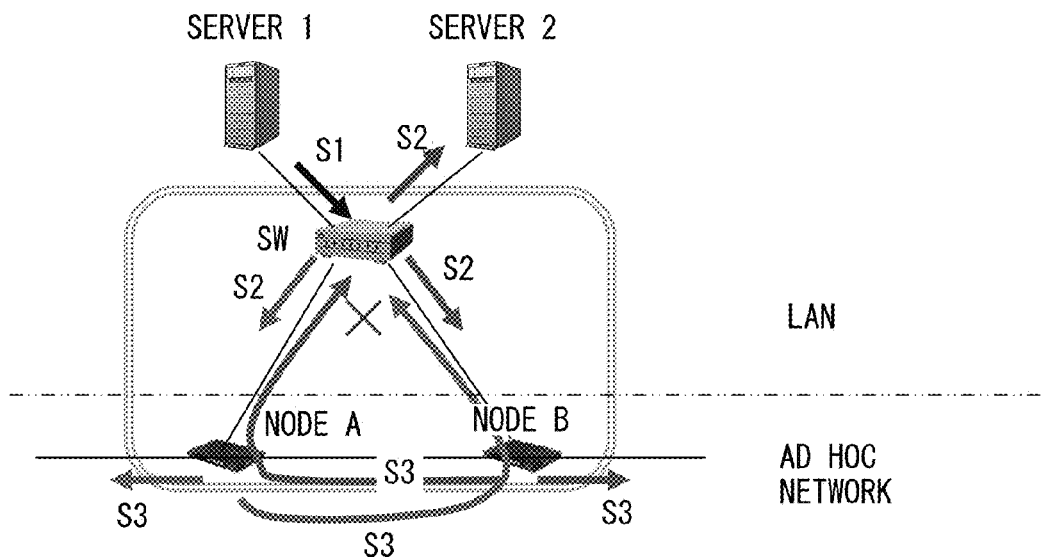
FIG. 2 is an explanatory view (1) of the problem with the duplex connection.

As an example of the duplex configuration above, there is a configuration illustrated in FIG. 2. In FIG. 2, a server 1 and a server 2 are connected to a switch SW in a LAN, and a node A and a node B in an ad hoc network are connected to the switch SW. That is, in FIG. 2, the server on the LAN side is duplexed, and the node on the ad hoc network side is duplexed.

With the configuration, for example, assume that an ARP request is transmitted by the server 1 to acquire a MAC address of the server 2 (S1 in FIG. 2). An ARP (Address Resolution Protocol) is a protocol used to acquire a MAC (Media Access Control) address from an IP (Internet Protocol) address in the Ethernet environment. An ARP request is broadcast information. In each device which has received an ARP request, and when the ARP request is not addressed to the local node, the ARP request is further transmitted to a port other than the reception port connected to the local device. When the ARP request is addressed to the local node, each device notifies the transmitter of the ARP request of the MAC address of the local device. As a result, the server 1 normally acquires the MAC address, and performs a communication with the server 2 using the MAC address of the server 2.

Upon receipt of the ARP request, the SW transmits the ARP request to all ports other than the port which has received the ARP request (S2 in FIG. 2).

The ARP requests are received by the nodes A and B. Since the ARP requests are not addressed to the nodes A and B, the ARP requests are further transmitted to all ports of the SW other than the ports of the SW which have received the ARP requests (S3 in FIG. 2).

In this case, for example, the ARP request transmitted by the SW to the node A may be returned to the SW through the node B, thereby generating a loop. In the network connection device and the server of the SW in the second network, the network goes down if a loop is generated in the network, and a communication is not correctly established. Therefore, the server 1 does not receive a reply to the ARP request from the server 2, and is not informed of the MAC address of the server 2.

Figure 3:
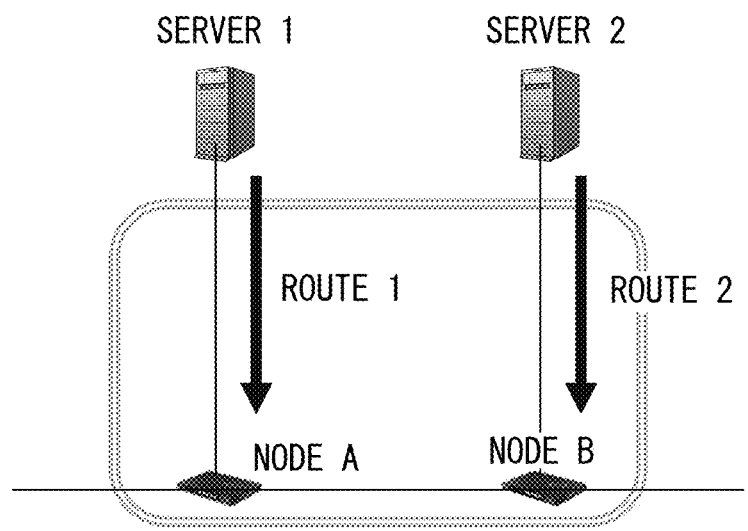
FIG. 3 is an explanatory view (2) of the problem with the duplex connection.

Thus, with the network configuration illustrated in FIG. 2, it is difficult to suppress the loop between the first network and the second network. Accordingly, it is hard to generate a duplex configuration as illustrated in FIG. 2. However, it is possible to generate a duplex configuration in which the first and second networks and the nodes A and B as illustrated in FIG. 3 are one-to-one connected. However, in the case of the configuration illustrated in FIG. 3, for example, if a fault occurs in the route 1, the server 1 does not access any point.

An aspect of the embodiments aim at realizing a duplex configuration for suppressing a loop with a high degree of freedom and with a load of a network designer reduced in connecting the first network such as an ad hoc network etc. to the second network such as a LAN etc.

The embodiments are described below in detail with reference to the attached drawings.

FIG. 4 is a network system according to an embodiment of the present invention.

An ad hoc network 401 configures the first network in which nodes as communication units are interconnected directly or through another node.

A LAN (Local Area Network) 402 configures the second network in which, for example, the servers 1 and 2 as communication units are interconnected through a switch SW as a network connection device.

In a relay network portion 403, the switch SW interconnects the nodes A and B as relay nodes which operate as gateways for collecting the information about all nodes in the ad hoc network 401 to the servers 1 and 2 in the LAN 402. That is, the nodes A and B on the ad hoc network 401 side are duplexed and the servers 1 and 2 on the LAN 402 side are also duplexed.

To avoid the above-mentioned problem of a loop of the communication information in the duplexed inter-connection in the first and second networks, there is a technique using a switch having the STP (Spanning Tree Protocol) function.

Figure 5:
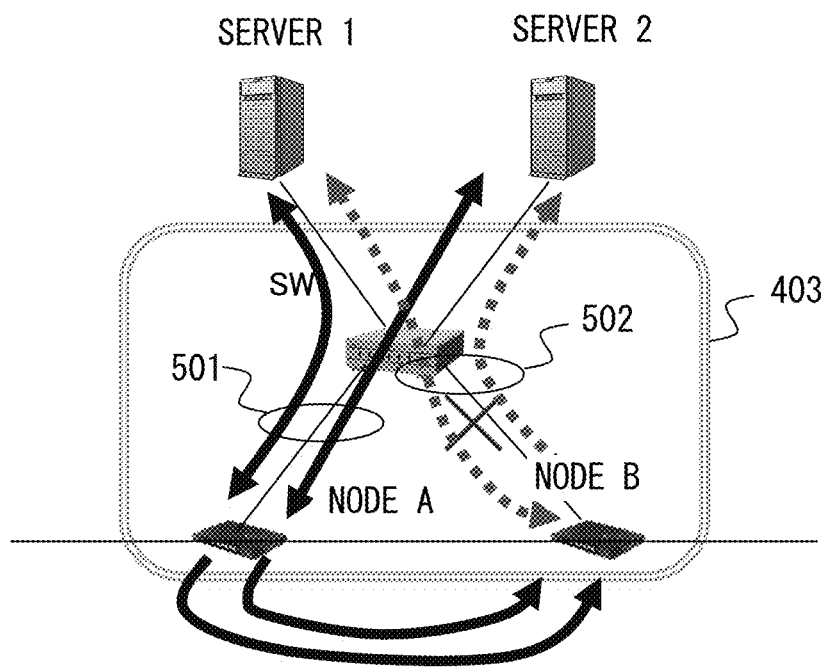
FIG. 5 is an explanatory view of the STP system.

FIG. 5 is an explanatory view of the STP system.

In the STP function, a loop state of the communication information is detected by transmitting special data called a BPDU (Bridge Protocol Data Unit). Thus, a specific route, for example, a route 501 is set as a constant route, and other routes, for example, a route 502 is cut off so that it is not to be used normally, and defined as a bypass in case a fault occurs. Thus, the nodes A and B are duplexed, and a loop of information communications is suppressed even when there is a physical loop among the switch SW and the nodes A and B.

However, with the duplex configuration using the STP function, as illustrated in FIG. 5, the servers 1 and 2 do not communicate with each node in the ad hoc network in a normal operation only through the route 501 using the node A. That is, the server 1 or 2 does not directly communicate with the node B. Therefore, in the normal operation, the duplex configuration in which, for example, the server 1 directly communicates with the node A or B, and simultaneously the server 2 directly communicates with the node A or B is not realized.

Therefore, when it is assumed that a switch with the STP function is used, difficult to sufficiently correspond to the duplex configuration with a high degree of freedom.

FIG. 6 is a configuration of the connection port of a node 601 corresponding to each relay node of the ad hoc network 401 illustrated in FIG. 4 according to the present embodiment. The node 601 includes a LAN port 602 for connection to the switch SW illustrated in FIG. 4, and a plurality of (for example, four) trunk ports 603 for connection to a plurality of nodes in the ad hoc network 401.

Figure 7A:
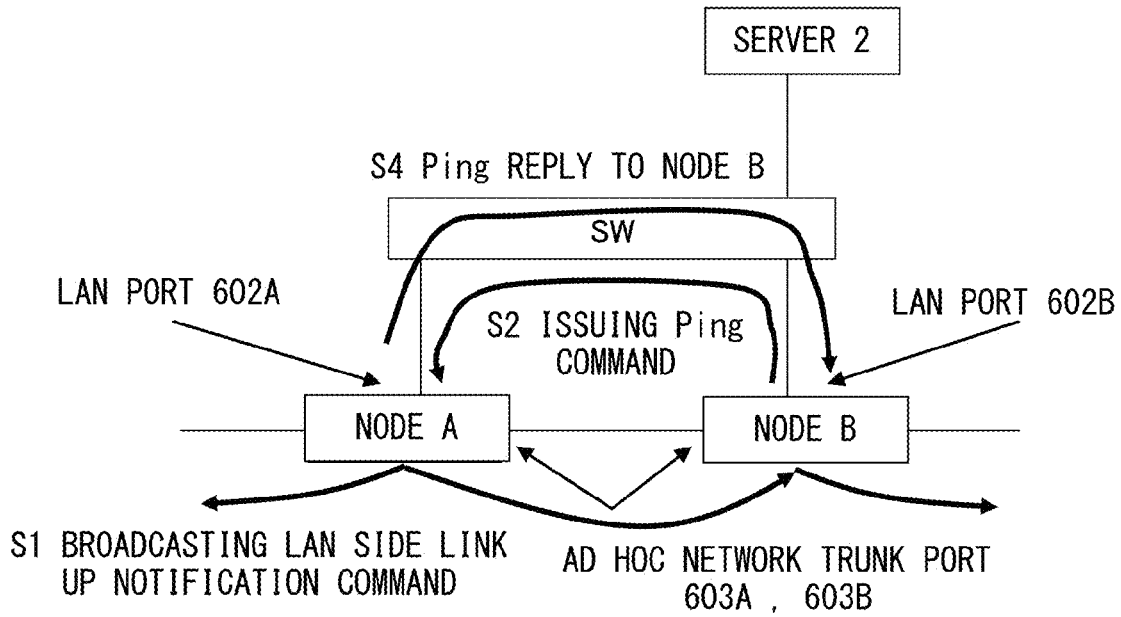
FIGS. 7A, 7B, and 7C are explanatory views of an entering operation on the identical segment table according to the embodiment.
Figure 7B:
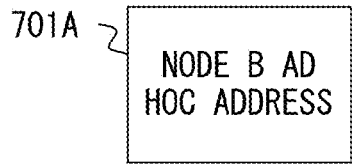
Figure 7C:
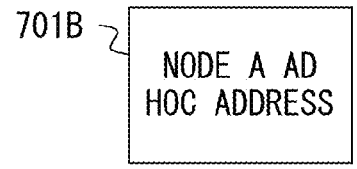

FIGS. 7A through 7C are explanatory views of the entering operation of the identical segment table according to the present embodiment.

According to the present embodiment, the nodes A and B (FIG. 4) respectively form identical segment tables 701A and 701B indicating the nodes A and B belong to the identical segment as illustrated in FIGS. 7B and 7C. Belonging to the identical segment refers to a connection under the condition that a broadcast frame transmitted in the second network can be received.

For example, assume that a LAN port 602A of the node A is in a non-link-up state, and a LAN port 602B of the node B is in a linked-up state. The non-link-up state refers to a state in which the LAN port 602A has not yet been opened in a communication enabled state.

When the LAN port 602A links up, the node A broadcasts a LAN side link up notification command from a trunk port 603A of the node A to the trunk port of another node (step S1 in FIG. 7A). According to the command, the node B is informed of the IP address of the LAN port 602A of the node A, and that the LAN port 602A of the node A has linked up.

In FIG. 7A, upon receipt of the LAN side link up notification command from any trunk port 603B, the node B issues an echo request packet, for example, a Ping request command from the LAN port 602B to the node A through the switch SW (step S2 in FIG. 7A). The Ping request command from the node B is received by the node A which has transmitted the LAN side link up notification command through the connected route. As described below, the node B receives an echo reply packet, for example, a Ping reply command from the node A (step S4), and confirms that Ping has received by the node A, thereby recognizing that the nodes A and B are connected between the LAN ports 602A and 602B.

As illustrated in FIG. 7A, when the node A first transmits the LAN side link up notification command, and receives the Ping request command from the node B (step S2 in FIG. 7A), it writes the ad hoc address of the node B as illustrated in FIG. 7B to the identical segment table 701A of the local node (step S3a).

Simultaneously, the node A returns a Ping reply from the LAN port to the node B (step S4 in FIG. 7A). Upon receipt of the Ping reply from the node A through the LAN port (step S4 in FIG. 7A)), the node B is informed that the node A exists in the identical segment. Thus, the node B writes the ad hoc address of the node A to the identical segment table 701B of the local node as illustrated in FIG. 7C (step S3b).

Under the control above, the information is protected from being looped when the broadcast information is input.

FIG. 8 is an example of a data configuration in which the LAN side link up notification command is an ad hoc command. In FIG. 8, a GD (global destination) field refers to a destination node ID on the ad hoc network 401 (FIG. 4) side. During the broadcast, the value of the GD field is 0xffffff. A GS (global source) field refers to a source node ID of the ad hoc network 401. A Type field refers to a data type. In this field, a value corresponding to the LAN side link up notification. A FID field refers to a frame identification ID. In this field, a sequential number is added to each frame. A TTL field refers to a frame retention time. A Length field refers to a frame length of a Body field portion. A FCS field refers to a frame check sequence for error correction of the ad hoc header (from the GD field to the Length) portion. A Body field refers to an IP address of the local node (the node A in this example).

FIG. 9 is an example of a data configuration of the Ping request command and the Ping reply command as a reply of the request command. The Ping request command and the reply to the request is realized as an ICMP (Internet Control Message Protocol) message. In FIG. 9, the TYPE field refers to the type of an ICMP message. In this field, a value indicating Ping is set. A code field refers to a Ping request command or a Ping reply. A checksum field is a field for an error check. An inherent header refers to a header inherent to each type of ICMP. An ICMP message field is variable length, and indicates the ad hoc address of the local node (the node B in this example) in the present embodiment. The ICMP header configured by the above-mentioned TYPE, code, checksum, and inherent header fields, and the ICMP message field configures an ICMP frame for a Ping request command. An IP header, a MAC header, and a Body potion (data and FCS) are further added to the ICMP frame, thereby configuring a transmission data.

As a destination IP address to be added to the IP header, an IP address of the node whose LAN port has been linked up is set. The IP address is acquired from the Body field of the received LAN side link up notification command.

The ad hoc address of the node B is acquired from the ICMP message field of the received Ping request command. The ad hoc address of the node A is acquired from the ICMP message field of the received Ping reply.

A data configuration example of the Ping reply is similar to that illustrated in FIG. 9, a value indicating the Ping reply is set in the command field, and the ad hoc address of the node A is set in the ICMP message field.

Next, the loop suppressing process performed when a broadcast frame is input according to the present embodiment is described with reference to FIG. 10.

Assume that the identical segment tables 701A and 701B illustrated in FIGS. 7B and 7C have been set in the nodes A and B respectively.

Figure 10:
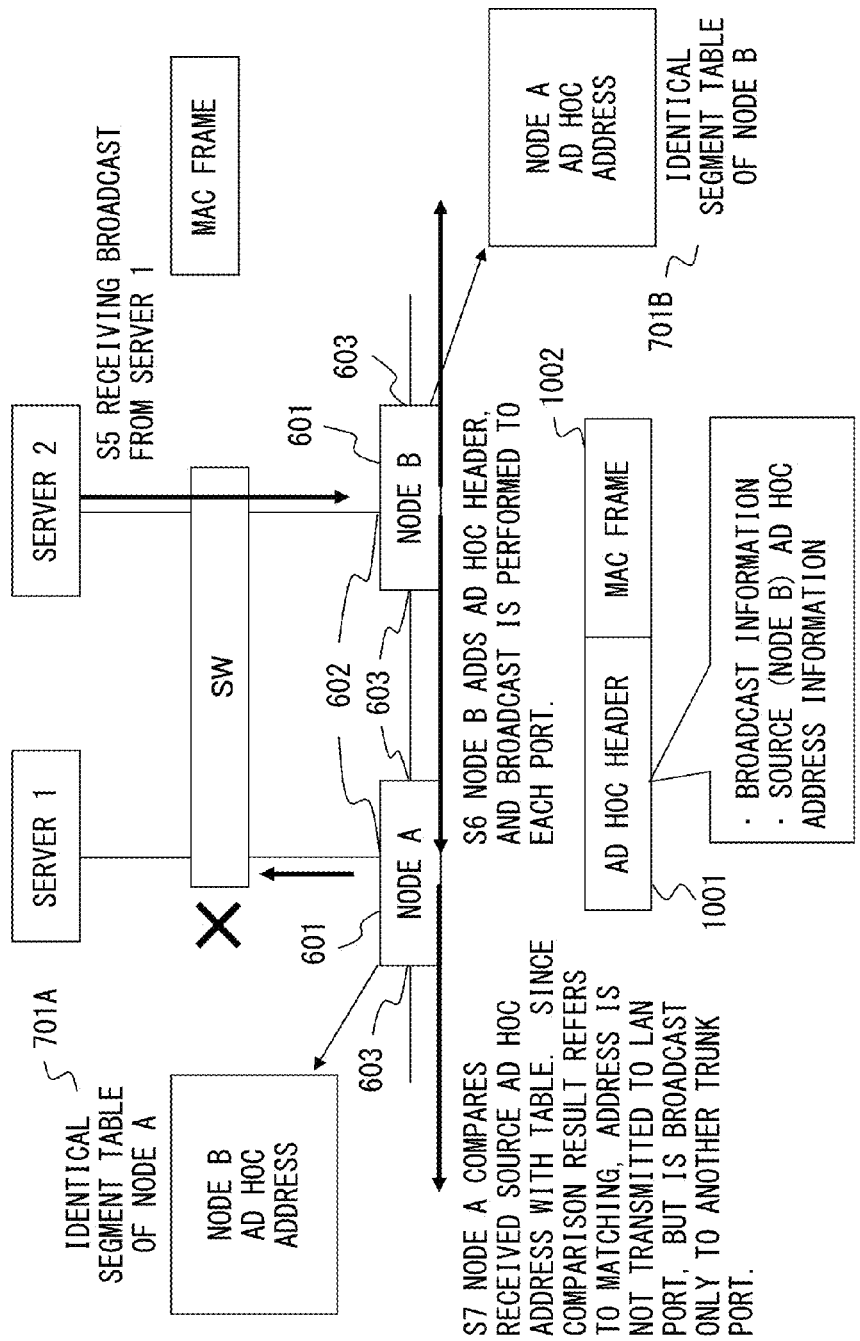
FIG. 10 is an explanatory view of a process of inputting a broadcast frame according to the embodiment.

In this state, for example, a broadcast frame is transmitted from the server 2, and reaches the node B through the switch SW (step S5 in FIG. 10). Although the broadcast frame also reaches the node A through the SW, the following operation is the same between both nodes. Therefore, only the node B is explained here.

The node B adds an ad hoc header 1001 to a MAC frame 1002 as a broadcast frame received from the LAN port, and transmits it from each trunk port 603 (displayed by simplifying the trunk port 603 in FIG. 6). The frame reaches each node, for example, one trunk port of the node A (step S6 in FIG. 10).

Each node, for example, the node A recognizes a broadcast frame in a frame received from any trunk port. The data configuration of the ad hoc header of the frame is similar to a data configuration example of the LAN side link up notification command illustrated in FIG. 8. That is, the GD field refers to a destination node ID. In the broadcast frame, the value of 0xffffff is set. By recognizing the setting, the broadcast frame is recognized. The GS field refers to a source node ID. If the received frame is a broadcast frame received from the node B, the ID of the node B is added to the field. Therefore, the node A is informed of the ad hoc address of the node B.

If each node, for example, the node A has recognized that the broadcast frame has been received by one trunk port, then the identical segment table 701A held by the local node is searched using the source node ID acquired from the received frame. As a result, if a hit is acquired by the search, each node does not transmit a received frame to the LAN port 602, but broadcasts it only to each trunk port 603 other than the receiving trunk port (step S7 in FIG. 10). In the case of node A, the ad hoc address of the source node B is hit. Thus, the node A does not transmit the received broadcast frame to the LAN port 602, but transmits it only to each trunk port 603. Thus, the loop of the broadcast frame is suppressed. That is, the broadcast frame from the server 2 is broadcast to the node A through the node B, but the loop from the node A to the node B through the switch SW is suppressed. Therefore, according to the embodiment of the present invention illustrated in FIG. 10, with the configuration in which the nodes A and B are multiplexed, the loop of the information is suppressed although there is a physical loop through the nodes A and B and the switch. Each node does not perform the process of searching the above-mentioned identical segment table for the frame received from the LAN port.

In addition to the above-mentioned basic operation, the first and second controlling processes described below are performed according to the present embodiment.

As the first controlling process, the process of maintaining the latest information about the identical segment table is performed.

First, as the operation reverse to step S1 in FIG. 7A above, any node broadcasts the LAN side link disconnection notification command to each trunk port when the LAN port disconnects its link, and completely clears the information in its identical segment table. The data configuration example of the LAN side link disconnection notification command is similar to that of the LAN side link up notification illustrated in FIG. 8. However, the value corresponding to the LAN side link disconnection notification is set in the TYPE field. From the value of the GS field of the command, other nodes are informed of the ad hoc address of the node in which the link disconnection of the LAN port has occurred. The other nodes delete the ad hoc address of the node from the identical segment table held by each of them.

In addition, the LAN side link up notification command transmitted by the operation is periodically transmitted not only during the activation of each node. In addition, the transmission interval of the command is varied by a setting. When each node receives the LAN side link up notification command, the ad hoc address information is overwritten to maintain the latest state of each table on the mutually identical segment table by communicating the Ping request command and reply as in the cases in S2 and S4 in FIG. 7A.

As the second controlling process, immediately after the LAN port linkup, the following controlling process is performed. That is, immediately after the linkup of the LAN port, there is the timing with which the communication of the Ping request command or the preparation of the identical segment table has not been performed. In this case, if the broadcast information is received or transmitted, a loop occurs. To avoid this, according to the present embodiment, for example, a guard period of several hundreds mS (millisecond) is set after detecting the linkup of the LAN port, and no broadcast information entering from the LAN port of another node is accepted in the period. The guard period is varied by a setting.

In the above-mentioned explanation of the present embodiment, there are two nodes on the ad hoc network side connected to the switch SW as illustrated in FIGS. 4 through 10. However, the technique disclosed according to the present embodiment is not limited to the case above, but the operation is performed as in the case above although two or more nodes are connected to the switch SW on the LAN 402 side. That is, for example, on the segment table of the node A, the ad hoc addresses of the plurality of nodes are stored, and the loop to the plurality of nodes is suppressed.

Although the servers 1 and 2 are multiplexed, the server 1 is connected to the node A through the switch SW, and the server 2 is connected to the node B through the switch SW. In this case, as described above, the loop of the information is avoided although there is a looped physical communication path of the switch SW and the nodes A and B. Therefore, according to the present embodiment, when the servers 1 and 2 and/or the nodes A and B are multiplexed, a load distribution is performed between the nodes A and B. Furthermore, the server 1 collects information from, for example, a network through the node A, and the server 2 controls an ad hoc network through the node B. Therefore, the function distribution is performed between the servers 1 and 2 or the nodes A and B.

The functions according to the embodiments above are described below.

1. Each relay node in an ad hoc network holds an identical segment table. The relay node includes a port for the second network such as a LAN etc. in addition to the port for the first network for an ad hoc network etc., and has the capability of relaying the information between the first and second networks.

2. The relay node in the ad hoc network broadcasts the LAN side linkup notification command storing the IP address of the local node to each trunk port of the local node when the LAN port of the local node links up, or periodically after the linkup.

Upon receipt of the LAN side link up notification command, the relay node in the ad hoc network transmits a Ping request command storing the ad hoc address of the local node to the LAN port of the local node at the IP address stored in the command. Then, it monitors the Ping reply corresponding to the Ping request command on the LAN port side. Upon receipt of the Ping reply, it enters (or overwrites) the ad hoc address stored in the commanding the identical segment table stored in the local node.

Upon receipt of a Ping request command from the LAN port, the relay node in the ad hoc network enters (or overwrites) the ad hoc address storing the command in the identical segment table held in the local node. Then, it transmits the Ping reply storing the ad hoc address of the local node to the LAN port of the local node at the source IP address stored in the received Ping request command.

3. When the LAN port of the local node disconnects the link, the relay node in the ad hoc network broadcasts the LAN side link disconnection notification command storing the IP address of the local node to each trunk port of the local node, and completely clears its identical segment table.

Upon receipt of the LAN side link disconnection notification command, the relay node in the ad hoc network deletes the source ad hoc address of the command from the identical segment table held by the local node.

4. The relay node in the ad hoc network adds the ad hoc header to the broadcast frame extracted from the LAN port, and transmits the frame from each trunk port.

Each relay node recognizes the broadcast frame from the destination node ID in the frequency received from any trunk port. Upon recognition of the broadcast frame, each relay node searches the identical segment table held by the local node using the source node ID which is acquired from the received frame. As a result, when the search makes a hit, each relay node does not transmit the received frame to the LAN port, but broadcasts it only to each trunk port.

With the above-mentioned four functions, a user of the network having the configuration of the first network such as an ad hoc network etc. connected to the second network such as a LAN etc. uses a connection configuration of a high degree of freedom without considering the loop of the communication information even using a duplexed relay network portion.

The effect of the present embodiment is summarized below with reference to the technique of using the STP function in FIG. 5.

a. Generally, a switch with the STP function is expensive, but a switch having the STP function is provided.

b. Not everybody has a high level of skill to set the STP function. According to the present embodiment, no skill is needed to set the function because a loop protection function is incorporated into the relay nodes A and B.

c. With the STP function, a connection is made from the switch SW to only one node A (or node B). Therefore, for example, when a different instruction is issued to each node in the ad hoc network 401 from each of the servers 1 and 2 in the LAN 402, the communication load is concentrated on one node A (or node B) if there is only one node available, thereby restricting the amount of data to be processed. Specifically when the ad hoc network 401 is a sensor network, the network size is limited if there is only one node to communicate with the LAN 402. In the present embodiment, the nodes A and B simultaneously communicate with the servers 1 and 2. Therefore, the load is distributed.

Furthermore, with the STP function, when the servers 1 and 2 perform the process having a different purpose, the servers 1 and 2 are not simultaneously connected to the two nodes A and B, thereby restricting the function of the system. According to the present embodiment, the function of a multiplexed server and a multiplexed node is distributed.

d. In the STP system, when there arises a fault in the route 501 of the node A, the route 501 is to be switched to the route 502 including the node B which has not been used. A switching time of several tens of or 50 seconds is taken to switch routes. There is also an RSTP (Rapid Spanning Tree Protocol) as an improved method, but it also requires a switching time of about one second at worst.

Since the switch SW and the routes of the nodes A and B are already used in the present embodiment, the route switching time is very short when a fault occurs.

As described above, the present embodiment suppresses the communication loop of the information even when there is a physical loop among the nodes A and B and the switch SW in the relay network portion including the duplexed relay nodes A and B in the first network and the switch of the second network having a protocol different from that of the first network. Furthermore, according to the present embodiment, although the relay node is duplexed and the server is not duplexed, the effects a, b, and d work on the technique having the STP function illustrated in FIG. 5. Furthermore, in the present embodiment illustrated in FIG. 10, when the server and the relay node are multiplexed, the effect c above works in addition to the effects a, b, and d above on the technique of the STP function.

Figure 12:
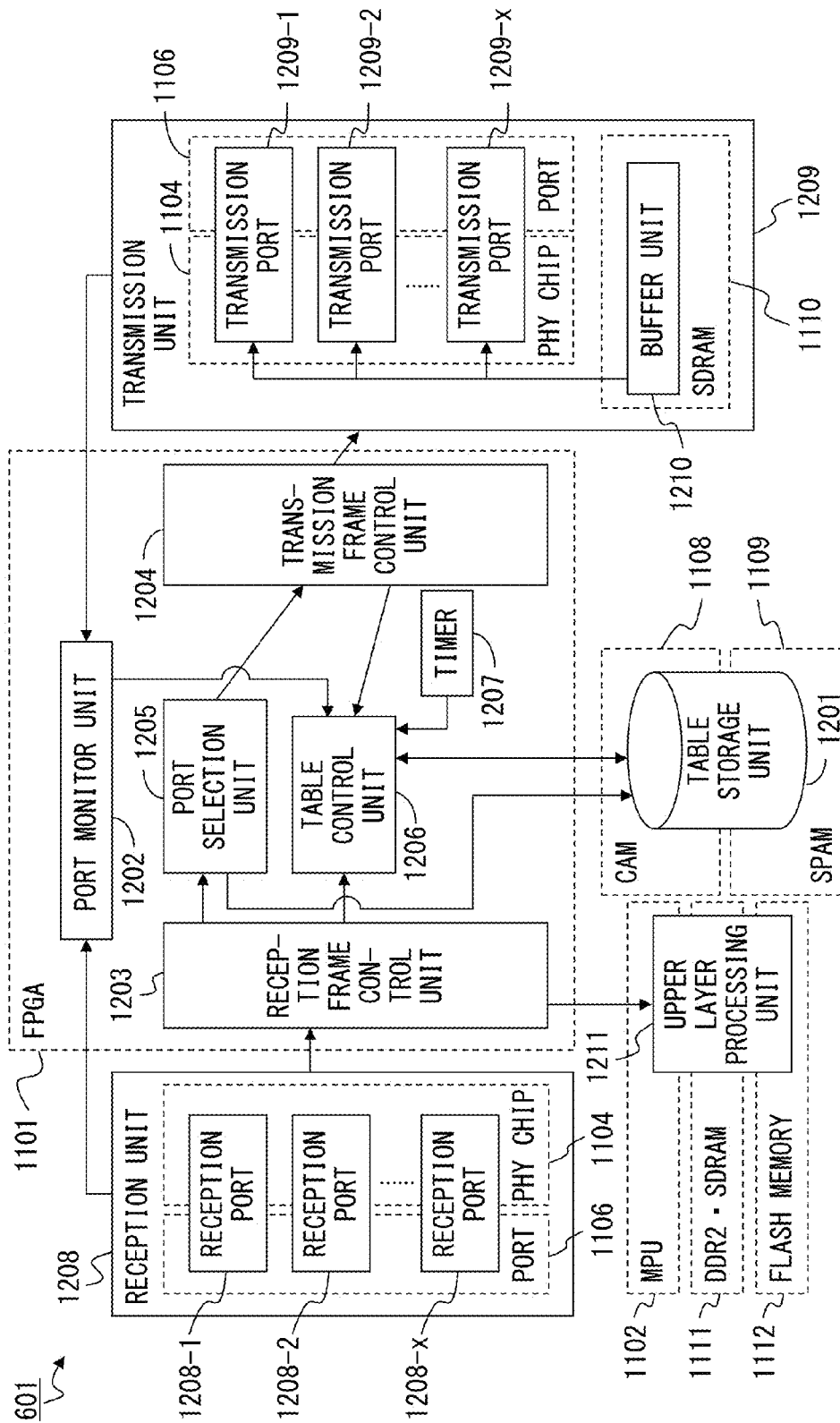
FIG. 12 is a block diagram of the function of a node.

FIG. 11 is a configuration of the hardware of the node 601 in FIG. 6 according to the present embodiment. FIG. 12 is a block diagram of the function of the node 601. In FIG. 12, the corresponding portions in FIG. 11 are assigned the identical reference numerals.

A cable ad hoc port 1106 corresponds to the trunk port 603 in FIG. 6, and inputs and outputs the communication information communicated with other nodes. The cable ad hoc port 1106 is terminated by a PHY (PHYsical Layer Device) 1104 including PHY 1 through 4 for encoding or decoding a transmission/reception frame. The portion configured by the cable ad hoc port 1106 and the PHY 1104 is functionally configured by a reception unit 1208 and a transmission unit 1209 as illustrated in FIG. 12. Each of reception ports 1208-1 through 1208-x of the reception unit 1208 performs a decoding operation etc. for each cable ad hoc port 1106. Each of transmission ports 1209-1 through 1209-x of the transmission unit 1209 performs an encoding operation etc. for each cable ad hoc port 1106. The transmission information is provided for each of the transmission ports 1209-1 through 1209-x through a buffer unit 1210 implemented in SDRAM (Synchronous Dynamic Random Access Memory) 1110. The frame data output and input to and from the PHY 1104 is connected to a FPGA (Field Programmable Gate Array) 1101 through the connection line of an MII (media independent interface) 1117.

A general-purpose LAN port 1107 corresponds to the LAN port 602 illustrated in FIG. 6, and is terminated by an L2SW (layer 2 switch) 1103.

The operation state of each transmission/reception port in the PHY 1104 is monitored by a port monitor unit 1202 in the FPGA 1101.

A reception frame control unit 1203 in the FPGA 1101 performs the process of receiving the frame data received by each of the reception ports 1208-1 through 1208-x in the PHY 1104.

When the received frame data is to be processed by the local node, the frame data received by the reception frame control unit 1203 is passed to an MPU (Micro Processing Unit) 1102 through the connection line of an MII 1114. The data is processed by an upper layer processing unit 1211 configured by the MPU 1102 and DDR2-SDRAM (Double-Data-Rate 2 Synchronous Dynamic Random Access Memory) 1111 controlled thereby, or flash memory (FLASH) 1112.

A port selection unit 1205 in the FPGA 1101 selects a transmitting port for the frame data received by the reception frame control unit 1203, and passes the data to a transmission frame control unit 1204. In this case, a port selection unit 1205 selects the transmitting port based on the contents of each routing table etc. in a table storage unit 1201 controlled by a table control unit 1206. In the present embodiment, the table storage unit 1201 also functions as a storage unit for storing an identical segment table as identical segment information.

The transmission frame control unit 1204 outputs and transmits the frame data received from the port selection unit 1205 to the transmission port specified by the port selection unit 1205 through the buffer unit 1210.

The table control unit 1206 enters, updates, and deletes various types of information on each routing table in the table storage unit 1201 or the identical segment table according to the present embodiment based on the transmission/reception state of the reception frame control unit 1203 and the transmission frame control unit 1204. In addition, the table control unit 1206 updates and deletes data on each routing table etc. in the table storage unit 1201 based on the timing state of a timer 1207.

The table storage unit 1201 is configured by CAM (content Addressable Memory) 1108 and SRAM (Static Random Access Memory) 1109 and SRAM (Static Random Access Memory) 1109. Using the associable memory function of the CAM 1108, a high-speed search is performed on various tables in the SRAM 1109. The identical segment table according to the present embodiment is also implemented therein. Based on the control of the table control unit 1206, an ad hoc address is searched, entered, updated, or deleted using the associable array function of the CAM 1108 on the identical segment table in the SRAM 1109.

The transmission frame control unit 1204 issues a transmit instruction to the L2SW 1103 through the MII 1116 in FIG. 11 when the frame data is to be transmitted to the general-purpose LAN port 1107. On the other hand, the frame data received by the L2SW 1103 from the general-purpose LAN port 1107 is received by the reception frame control unit 1203 in the FPGA 1101 from the MII 1116, or after decoded by a PHY 1105, it is received by the upper layer processing unit 1211 through an MII 1115.

Figure 13B:
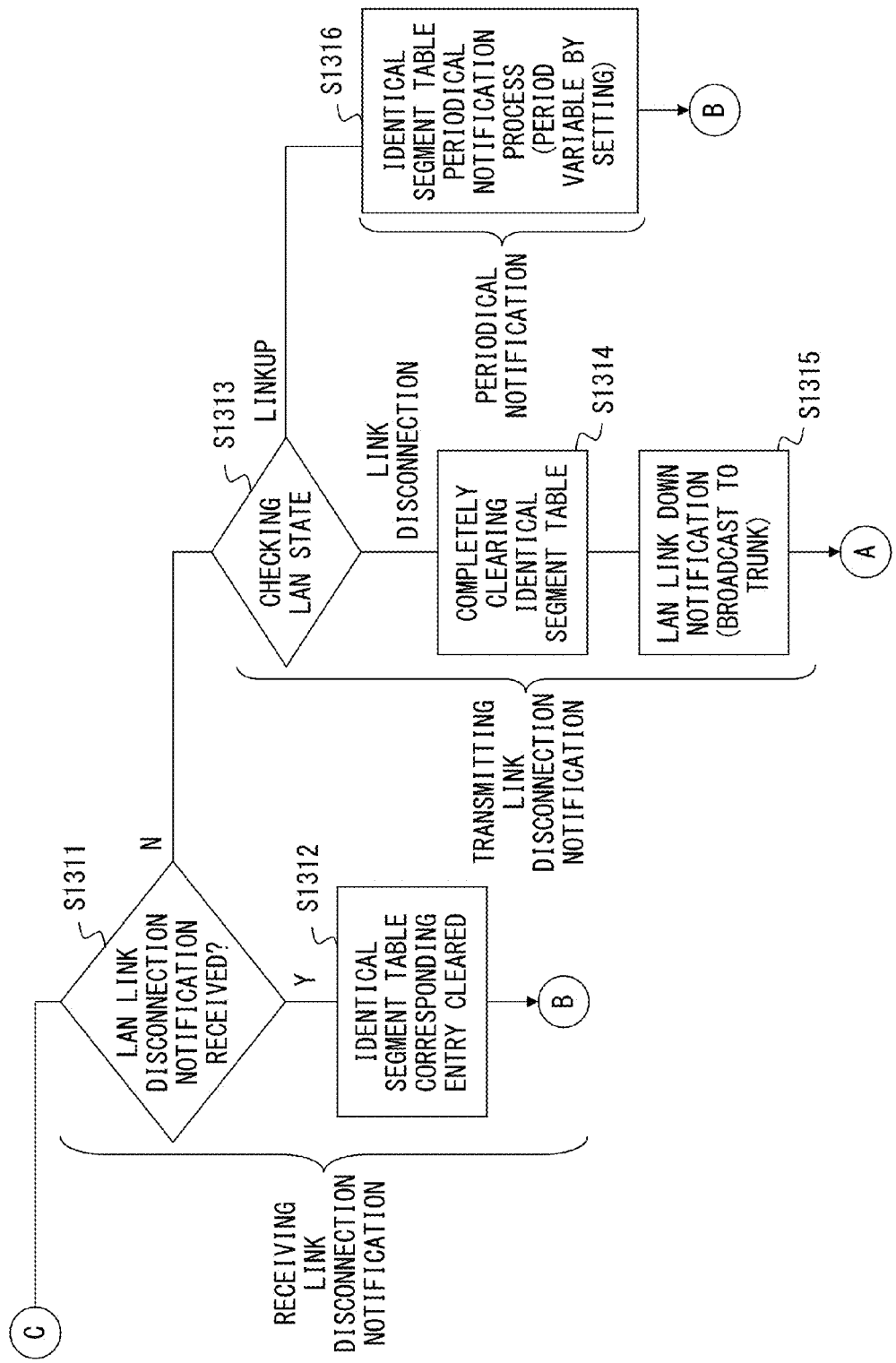

FIGS. 13A and 13B are operation flowcharts of the entering, updating, and deleting processes of the identical segment table. The operation flowcharts are realized as, for example, the function of the table control unit 1206 in the FPGA 1101 illustrated in FIG. 12.

In FIG. 13A, the processes in steps S1301 through S1303 relate to the process of transmitting a LAN side link up notification command.

First, the state of the general-purpose LAN port 1107 is checked (step S1301). If the general-purpose LAN port 1107 is in the link disconnection state, the determining process is repeatedly performed. The determining process is the process of the table control unit 1206 determining the monitor result of the port monitor unit 1202.

If the state of the general-purpose LAN port 1107 refers to link up, the table control unit 1206 in FIG. 12 controls the port selection unit 1205 in the guard period of, for example, several hundreds mS as described above as the second controlling process to stay in the wait state so that the broadcast information received from the general-purpose LAN port 1107 of another node is not accepted (step S1302).

Afterwards, by the table control unit 1206 in FIG. 12 controlling the port selection unit 1205, the LAN side link up notification command is broadcast to each transmission port of the cable ad hoc port 1106 (step S1303). Thus, the above-mentioned controlling process in step S1 in FIG. 7A is realized.

Next, steps S1304 through S1306 refer to the processes processed after transmitting the LAN side link up notification command.

First, the table control unit 1206 issues an inquiry to the reception frame control unit 1203 to determine whether or not a Ping request command addressed to the local node has been received from the general-purpose LAN port 1107 through the L2SW 1103 (step S1304).

If the determination in step S1304 is NO, control is passed to step S1307.

If the Ping request command is received, and the determination in step S1304 is YES, the table control unit 1206 writes the ad hoc address of the node stored in the Ping request command to the identical segment table stored in the table storage unit 1201 (step S1305). Thus, a part of the above-mentioned controlling process as S2 in FIG. 7A is realized.

Then, the table control unit 1206 controls the port selection unit 1205 to return a Ping reply from the L2SW 1103 through the general-purpose LAN port 1107 (step S1306). In this case, in response to the Ping reply, the table control unit 1206 sets the value indicating the Ping reply in the command field, and sets the ad hoc address of the local node in the ICMP message field (FIG. 9). Thus, a part of the above-mentioned controlling process is realized as S3 in FIG. 7A.

Next, the processes in steps S1307 through S1310 are the process of receiving the LAN side link up notification command.

First, the table control unit 1206 issues an inquiry to the reception frame control unit 1203 to determine whether or not the LAN side link up notification command has been received from the cable ad hoc port 1106 through the reception unit 1208 (step S1307).

If the determination in step S1307 is NO, control is passed to step S1311.

If the LAN side link up notification command is received and the determination in step S1307 is YES, then the table control unit 1206 controls the port selection unit 1205, and transmits a Ping request command from the L2SW 1103 through the general-purpose LAN port 1107 (step S1308). In this case, in response to the Ping request command, the table control unit 1206 sets the value indicating the Ping request in the command field, and sets the ad hoc address of the local node in the ICMP message field (FIG. 9). In addition, as a destination IP address added to the IP header (FIG. 9), the IP address acquired from the Body field of the LAN side linkup notification command is set. The IP address relates to the linkup originating node. Thus, a part of the above-mentioned controlling process as S2 in FIG. 7A is realized.

Then, the table control unit 1206 issues an inquiry to the reception frame control unit 1203 to determine for a specified period whether or not the Ping reply addressed to the local node has been received from the general-purpose LAN port 1107 through the L2SW 1103 (step S1309).

If no Ping reply is received in the specified period, the identical segment table is not operated in response to the LAN side link up notification command, but control is returned to step S1304.

In response to the Ping reply, and if the determination in step S1309 is YES, the table control unit 1206 writes the ad hoc address of the node stored in the Ping reply to the identical segment table in the table storage unit 1201 (step S1310). Thus, apart of the above-mentioned controlling process is realized as S3 in FIG. 7A. Afterwards, control is returned to step S1304.

The processes in steps S1311 and S1312 are a receiving process of a LAN side link disconnection notification command.

First, the table control unit 1206 issues an inquiry to the reception frame control unit 1203 to determine whether or not the LAN side link disconnection notification command has been received from the cable ad hoc port 1106 through the reception unit 1208 (step S1311).

If the determination in step S1311 is NO, control is passed to step S1313.

If the LAN side link disconnection notification command is received and the determination in step S1311 is YES, then the table control unit 1206 deletes the ad hoc address of the link disconnection originating node from the identical segment table held in the table storage unit 1201 (step S1312). The address is acquired from the GS field of the LAN side link disconnection notification command. Afterwards, control is returned to step S1304.

The processes in steps S1313 through S1315 are a transmitting process for the LAN side link disconnection notification command.

First, the state of the general-purpose LAN port 1107 is checked (step S1313). The determining process is performed by the table control unit 1206 to determine a monitor result of the port monitor unit 1202.

If the general-purpose LAN port 1107 is in a link up state, control is passed to step S1316.

When the general-purpose LAN port 1107 enters the link disconnection state, the table control unit 1206 completely clears the contents of the identical segment table in the table storage unit 1201 (step S1314).

Then, the table control unit 1206 in FIG. 12 controls the port selection unit 1205 to broadcast the LAN side link disconnection notification command to each transmission port of the cable ad hoc port 1106 (step S1315).

The process in step S1316 is a process of periodically reporting the LAN side link up notification command. In this step, if a specified time has passed from the time of the previous command transmission, the process similar to the process in step S1303 is performed. That is, by the table control unit 1206 in FIG. 12 controlling the port selection unit 1205, the LAN side link up notification command is broadcast to each transmission port of the cable ad hoc port 1106.

Figure 14:
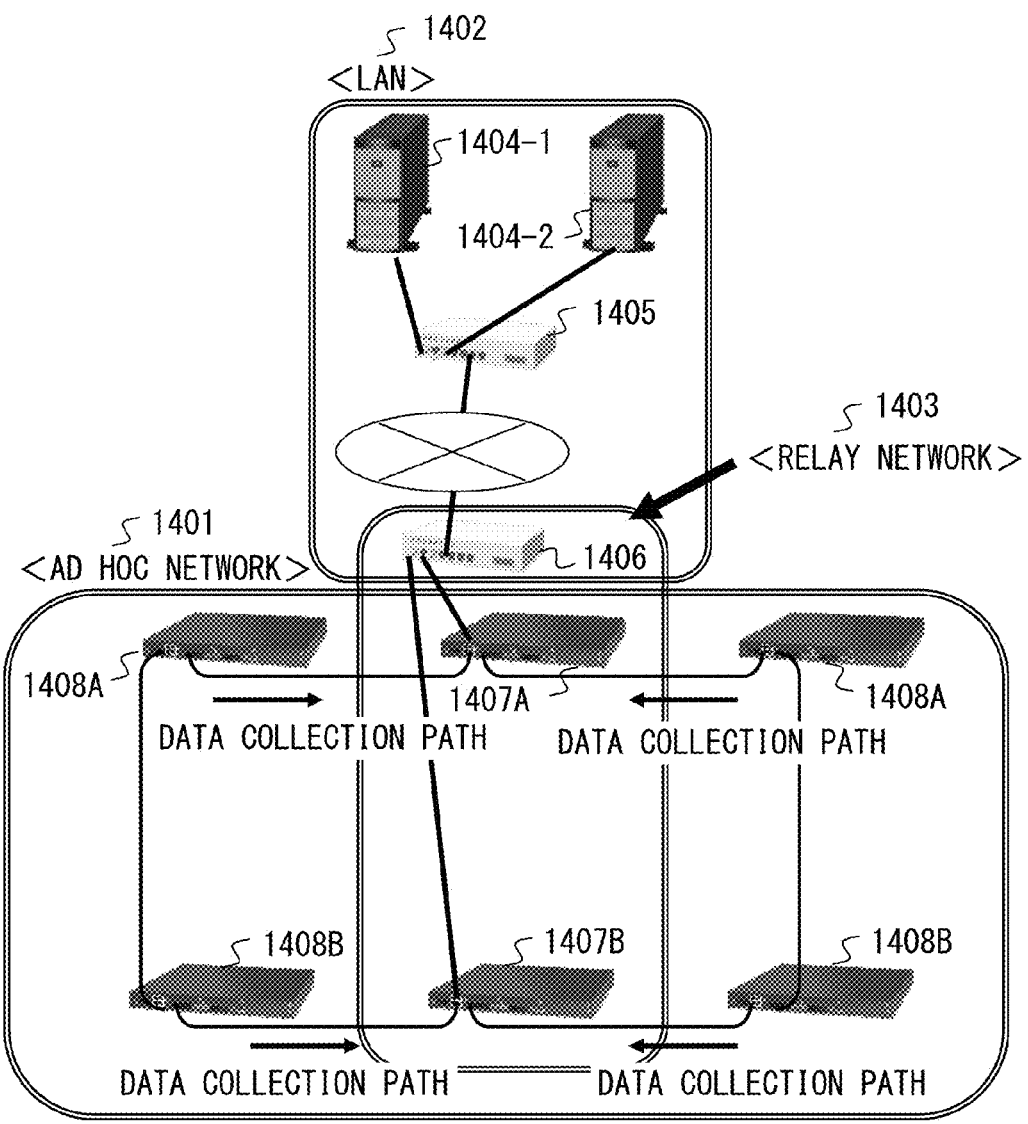
FIG. 14 is a practical example of the network system according to the embodiment.

FIG. 14 is an example of a practical configuration of the network system according to the present embodiment. In FIG. 14, a switch 1406 in a relay network 1403 is connected to nodes 1407A and 1407B as relay nodes to be the gateway in an ad hoc network 1401. Furthermore, servers 1404-1 and 1404-2 etc. are connected to the switch 1405 etc. The node 1407A collects data from another node group 1408A in the ad hoc network 1401, and transmits the data to the servers 1404-1 and 1404-2 through the switches 1406 and 1405 etc. The node 1407B collects data from another node group 1408B in the ad hoc network 1401, and transmits the data to the servers 1404-1 and 1404-2 through the switches 1406 and 1405. Thus, the duplex configuration of the servers 1404-1 and 1404-2 and the switches 1407A and 1407B is realized.

In the above-mentioned embodiment, for example, the table storage unit 1201 in FIG. 12 functions as a storage unit for storing the identical segment information as an identical segment table.

For example, the node 601 for performing the operation in S7 in FIG. 10 and the table control unit 1206 in FIG. 12 function as a loop suppressing unit.

For example, the node 601 for performing the operation in S1 in FIG. 7A and the table control unit 1206 in FIG. 12 for performing the processes in step S1301 through S1303 in FIG. 13A function as a linkup notification unit.

For example, the node 601 for performing the operations in S2 and S3 in FIG. 7A and the table control unit 1206 in FIG. 12 for performing the processes in steps S1307 through S1310, and S1304 through S1306 in FIG. 13A function as an attainment confirmation unit and an identical segment generation and update unit.

For example, the table control unit 1206 in FIG. 12 for performing the processes in steps S1311 through S1315 in FIG. 13B functions as a link disconnection control unit.

Figure 15:
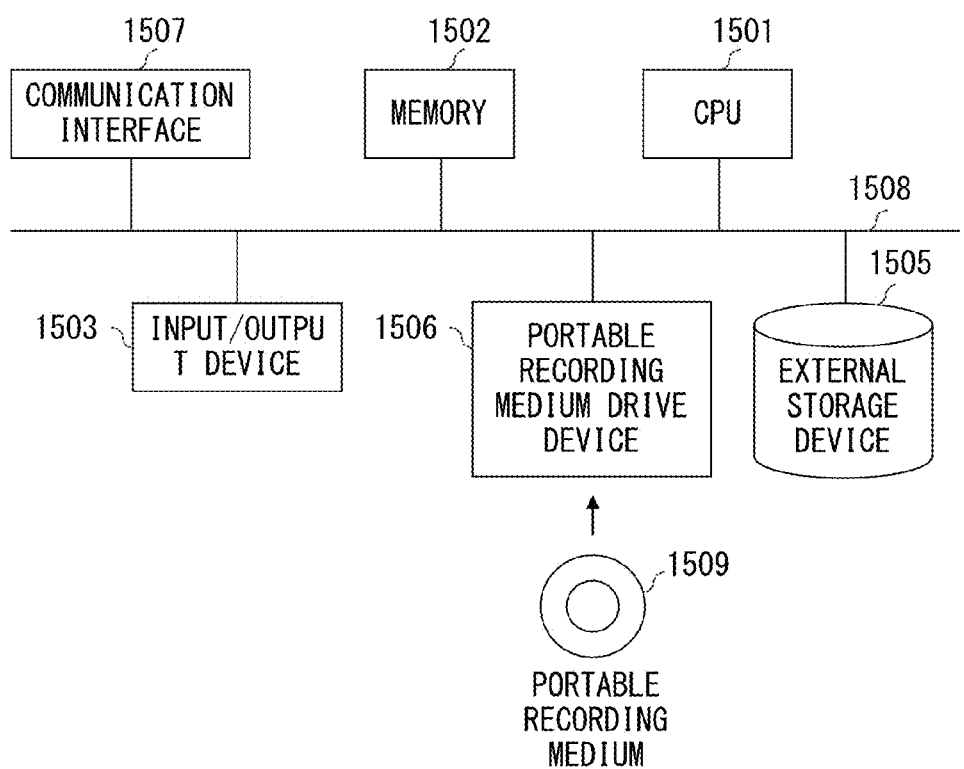
FIG. 15 is a configuration of hardware capable of realizing the embodiment.

FIG. 15 is an example of a hardware configuration of the computer capable of realizing the above-mentioned system as a software process.

The computer illustrated in FIG. 15 includes a CPU 1501, memory 1502, an input/output device 1503, an external storage device 1505, a portable recording medium drive device 1506 into which a portable recording medium 1509 is inserted, and a communication interface 1507, and these components are interconnected through a 1508. The configuration illustrated in FIG. 15 is an example of a computer capable of realizing the above-mentioned system, and the computer is not limited to the configuration.

The CPU 1501 performs the entire control of the computer. The memory 1502 is memory such as RAM etc. for temporarily storing a program or data stored in the external storage device 1505 or the portable recording medium 1509 when the program is executed, the data is updated, etc. The CPU 1501 performs the entire control by reading the program to the memory 1502 and executing the program.

The input/output device 1503 detects the inputting operation by a user using a keyboard, a mouse, etc., notifies the CPU 1501 of the detection result, and outputs the data transmitted by the control of the CPU 1501 to a display device and a printer device.

The external storage device 1505 is, for example, a hard disk storage device, and is mainly used in storing various types of data and programs.

The portable recording medium drive device 1506 accommodates the portable recording medium 1509 such as an optical disk, SDRAM, CompactFlash, etc., and functions as an auxiliary to the external storage device 1505.

The communication interface 1507 is to connect a communication circuit of, for example, a LAN (Local Area Network), or a WAN (Wide Area Network).

The system according to the present embodiment is realized by the CPU 1501 executing the program provided with the function realized as illustrated according to the flowchart illustrated in FIGS. 13A and 13B. The program is recorded on the external storage device 1505 and the portable recording medium 1509 and distributed, or acquired from a network through the communication interface 1507.

A duplex configuration at a high degree of freedom is realized by suppressing a loop of a relay network portion including the first network connected to the second network having a protocol different from that of the first network with a reduced load of a network designer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network relay node device connecting to a switch device, the network relay node device relaying communication between a first network and a second network having a protocol different from a protocol of the first network through the switch device that belongs to the second network, the network relay node device comprising:
   a controller configured to perform a process including:
      generating identical segment information including node identifier information of another relay node device belonging to a same segment as the network relay node device in the second network; and
      broadcasting a received broadcast frame only to a connection port of the first network other than a connection port of the second network when the node identifier information included in the identical segment information is detected from a header of the broadcast frame and the broadcast frame is received from the connection port of the first network,
   wherein the network relay node device belongs to the second network, and the second network is configured by an interconnected network in which the network relay node device and another network relay node device are interconnected.

2. The network relay node device according to claim 1, wherein the generating performs procedures including:
   broadcasting linkup notification information indicating that the connection port of the second network of the network relay node device has linked up from the connection port of the first network;
   confirming an attainment using the connection port of the second network with a relay node device specified by the linkup notification information when the linkup notification information is received; and
   generating or updating the identical segment information based on a confirmation result of the attainment.

3. The network relay node device according to claim 2, wherein
   the broadcasting linkup notification information adds address information on the second network of the network relay node device to the linkup notification information; and
   the confirming and the generating or updating the identical segment information based on the confirmation result includes
      defining the address information on the second network added to the linkup notification information as a destination address,
      defining the address information on the second network of the network relay device as a source address,
      transmitting a Ping request packet provided with the address information on the first network of the network relay node device using the connection port of the second network,
      monitoring a Ping reply packet corresponding to the Ping request packet on the connection port of the second network,
      retrieving the address information on the first network of a source relay node device when the Ping reply packet is received,
      adding the address information to the identical segment information,
      acquiring the address information on the first network of the source relay node device when the Ping request packet is received from the connection port of the second network after the linkup notification information is transmitted, adding the identical segment information stored in the network relay node device, and transmitting a Ping reply packet corresponding to the Ping request packet provided with the address information on the first network of the network relay node device using the connection port of the second network.

4. The network relay node device according to claim 2, wherein the generating or updating the identical segment information based on the confirmation result further includes broadcasting the linkup notification information when the connection port of the second network links up or until the connection port of the second network links down after the port links up.

5. The network relay node device according to claim 2, wherein the generating or updating the identical segment information based on the confirmation result includes broadcasting link disconnection notification information indicating that the connection port of the second network of the network relay node device has linked down from the connection port of the first network, and completely clearing information in an identical segment table.

6. The network relay node device according to claim 2, the processes further including updating the identical segment information according to the link disconnection notification information when the link disconnection notification information is received.

7. A network relay system comprising:

a switch device that connects a first network with a second network having a protocol different from a protocol of the first network and belongs to the second network;

a plurality of relay nodes provided in the first network, and that configures at least one loop in a communication path including the switch device; and a plurality of servers provided in the second network, and connected to the switch device, wherein at least two relay nodes of the plurality of relay nodes are connected to the switch device, each of the plurality of nodes performs a process including generating, when a first node of the plurality of nodes transmits information about a connection state for the second network, identical segment information including node identifier information of another relay node device belonging to a same segment as the network relay node device in the second network; and broadcasting a received broadcast frame to a connection port of the first network other than a connection port of the second network when the node identifier information included in the identical segment information is detected from a header of the broadcast frame and the broadcast frame is received from the connection port of the first network, and the plurality of relay nodes belongs to the second network, and the second network is configured by an interconnected network in which the plurality of relay nodes are interconnected.

8. A network relay method using a network relay node device for relaying communication between a first network and a second network having a protocol different from a protocol of the first network through a switch device that belongs to the second network, the network relay method comprising:

generating, by using the relay node device, identical segment information including node identifier information of another relay node device belonging to a same segment as the network relay node device in the second network; and broadcasting, by using the relay node device, a received broadcast frame only to a connection port of the first network other than a connection port of the second network when the node identifier information included in the identical segment information is detected from a header of the broadcast frame and the broadcast frame is received from the connection port of the first network, wherein the network relay node device belongs to the second network, and the second network is configured by an interconnected network in which the network relay node device and another network relay node device are interconnected.

9. The network relay method according to claim 8, further comprising:

broadcasting, by using the relay node device, linkup notification information indicating that the connection port of the second network of the network relay device has linked up from the connection port of the first network;

confirming, by using the relay node device, an attainment using the connection port of the second network with a relay node device specified by the linkup notification information when the linkup notification information is received; and generating or updating the identical segment information based on a confirmation result of the attainment.

10. The network relay method according to claim 9, wherein:

the broadcasting, by using the relay node device, linkup notification information adds address information on the second network of the network relay node device to the linkup notification information; and the confirming and the generating or updating the identical segment information based on the confirmation result includes:

defining the address information on the second network added to the linkup notification information as a destination address, defining the address information on the second network of the network relay node device as a source address, transmitting a Ping request packet provided with the address information on the first network of the network relay node device using the connection port of the second network, monitoring a Ping reply packet corresponding to the Ping request packet on the connection port of the second network, retrieving the address information on the first network of a source relay node device when the Ping reply packet is received, adding the address information to the identical segment information;

acquiring the address information on the first network of the source relay node device when the Ping request packet is received from the connection port of the second network after the linkup notification information is transmitted, adding the address information to the identical segment information stored in the network relay node device, and transmitting a Ping reply packet corresponding to the Ping request packet provided with the address information on the first network of the network relay node device using the connection port of the second network.

11. The network relay method according to claim 9, wherein the generating or updating the identical segment information based on the confirmation result further includes periodically broadcasting the linkup notification information when the connection port of the second network links up or until the connection port of the second network links down after the port links up.

12. The network relay method according to claim 9, wherein the generating or updating the identical segment information based on the confirmation result includes broadcasting link disconnection notification information indicating that the connection port of the second network of the network relay node device has linked down from the connection port of the first network, and has cleared completely information in an identical segment table.

13. The network relay method according to claim 9, further comprising updating the identical segment information according to the link disconnection notification information when the link disconnection notification information is received.

14. A non-transitory, computer-readable recording medium having stored therein a program that when executed causes a network relay node device to perform a process for relaying communication between a first network and a second network having a protocol different from a protocol of the first network through a switch device that belongs to the second network, the process comprising:
generating identical segment information including node identifier information of another relay node device belonging to a same segment as the network relay node device in the second network; and
broadcasting a received broadcast frame only to a connection port of the first network other than a connection port of the second network when the node identifier information included in the identical segment information is detected from a header of the broadcast frame and the broadcast frame is received from the connection port of the first network,
wherein the network relay node device belongs to the second network, and the second network is configured by an interconnected network in which the network relay node device and another network relay node device are interconnected.

15. The non-transitory, computer-readable recording medium according to claim 14, the process further comprising:
broadcasting linkup notification information indicating that the connection port of the second network of the network relay device has linked up from the connection port of the first network;
confirming an attainment using the connection port of the second network with a relay node device specified by the linkup notification information when the linkup notification information is received; and
generating or updating the identical segment information based on a confirmation result of the attainment.

16. The non-transitory, computer-readable recording medium according to claim 15, wherein:
the broadcasting linkup notification information adds address information on the second network of the network relay node device to the linkup notification information; and
the confirming and the generating or updating the identical segment information includes
defining the address information on the second network added to the linkup notification information as a destination address,
defining the address information on the second network of the network relay node device as a source address,
transmitting a Ping request packet provided with the address information on the first network of the network relay node device using the connection port of the second network,
monitoring a Ping reply packet corresponding to the Ping request packet on the connection port of the second network,
retrieving the address information on the first network of a source relay node device when the Ping reply packet is received,
adding the address information to the identical segment information,
acquiring the address information on the first network of the source relay node device when the Ping request packet is received from the connection port of the second network after the linkup notification information is transmitted,
adding the address information to the identical segment information stored in the network relay node device, and
transmitting a Ping reply packet corresponding to the Ping request packet provided with the address information on the first network of the network relay node device using the connection port of the second network.

17. The non-transitory, computer-readable recording medium according to claim 15, wherein the generating or updating the identical segment information based on the confirmation result further includes periodically broadcasting the linkup notification information when the connection port of the second network links up or until the connection port of the second network links down after the port links up.

18. The non-transitory, computer-readable recording medium according to claim 15, wherein the generating or updating the identical segment information based on the confirmation result broadcasts link disconnection notification information indicating that the connection port of the second network of the network relay node device has linked down from the connection port of the first network, and clearing completely information in an identical segment table.

19. The non-transitory, computer-readable recording medium according to claim 15, the process further comprising updating the identical segment information according to the link disconnection notification information when the link disconnection notification information is received.

* * * * *